(12) United States Patent
Raynor

(10) Patent No.: US 12,377,429 B2
(45) Date of Patent: Aug. 5, 2025

(54) FLUIDIC EJECTION DEVICE WITH OPTICAL BLOCKAGE DETECTOR

(71) Applicant: STMICROELECTRONICS (RESEARCH & DEVELOPMENT) LIMITED

(72) Inventor: Jeffrey M. Raynor, Edinburgh (GB)

(73) Assignee: STMICROELECTRONICS (RESEARCH & DEVELOPMENT) LIMITED, Marlow (GB)

( * ) Notice: Subject to any disclaimer, the term of this patent is extended or adjusted under 35 U.S.C. 154(b) by 1 day.

(21) Appl. No.: 18/179,978

(22) Filed: Mar. 7, 2023

(65) Prior Publication Data

US 2023/0234086 A1   Jul. 27, 2023

Related U.S. Application Data

(62) Division of application No. 16/988,346, filed on Aug. 7, 2020, now Pat. No. 11,623,236.

(51) Int. Cl.
| | | |
|---|---|---|
| *B41J 2/21* | (2006.01) | |
| *B05B 12/00* | (2018.01) | |
| *B29C 64/209* | (2017.01) | |
| *B29C 64/386* | (2017.01) | |
| *B33Y 50/00* | (2015.01) | |
| *B41J 2/165* | (2006.01) | |

(52) U.S. Cl.
CPC .......... *B05B 12/004* (2013.01); *B41J 2/2142* (2013.01); *B29C 64/209* (2017.08); *B29C 64/386* (2017.08); *B33Y 50/00* (2014.12); *B41J 2/16579* (2013.01)

(58) Field of Classification Search
CPC .... B41J 2/16579; B41J 29/393; B41J 2/0451; B41J 2/2142; B41J 29/38; B41J 2/04561; B41J 2/195; B29C 64/209; B29C 64/386; B33Y 30/00; B33Y 50/00
USPC ..................... 347/6, 9, 14, 19, 101
See application file for complete search history.

(56) References Cited

U.S. PATENT DOCUMENTS

| | | |
|---|---|---|
| 6,648,444 B2 | 11/2003 | Valero et al. |
| 7,502,061 B2 | 3/2009 | Raynor |
| 9,770,906 B2 | 9/2017 | Smith et al. |
| 9,770,909 B2 | 9/2017 | Chen et al. |
| 2002/0008723 A1 | 1/2002 | Wen et al. |
| 2002/0140756 A1 | 10/2002 | Kuriyama et al. |
| 2006/0170733 A1 | 8/2006 | Lee et al. |
| 2016/0167364 A1* | 6/2016 | Matsumoto .......... B41J 2/14153 347/9 |
| 2018/0065371 A1 | 3/2018 | Cattaneo et al. |

* cited by examiner

*Primary Examiner* — Jannelle M Lebron
(74) *Attorney, Agent, or Firm* — SEED IP LAW GROUP LLP

(57) ABSTRACT

The present disclosure is directed to a fluidic ejection device configured to detect whether one or more nozzles of the fluidic ejection device is in a normal state, a blocked nozzle state, or an accumulated fluid state. The fluidic ejection device includes an optical blockage detector having a light emitting device configured to emit a light signal, and a light sensor configured to detect the light signal. The optical blockage detector detects the normal state, the blocked nozzle state, and the accumulated fluid state based on the detected light signal.

21 Claims, 7 Drawing Sheets

FLUIDIC EJECTION DEVICE WITH OPTICAL BLOCKAGE DETECTOR

BACKGROUND

Technical Field

The present disclosure is directed to a fluidic device configured to detect blockage of one or more nozzles.

Description of the Related Art

Fluidic devices are used for a variety of applications. For example, fluidic devices are often used in printing applications, such as for implementing printer heads for inkjet printers and 3D printers. Fluidic devices are also often used in medical applications to eject, for example, biological materials and drugs into patients.

Typically, fluidic devices include a plurality of nozzles in which fluid is ejected and dispensed from. Unfortunately, it is common for these nozzles to become blocked or clogged with fluid when stored for long periods of time or even during operation of the fluidic device.

The blockage of the nozzles prevents fluid from being ejected properly from the nozzles. For printing applications, for example, blockage of the nozzles often results in text or images with portions being degraded or missing. In addition, blocked fluid, such as ink, may accumulate over time and eventually protrude from a nozzle. Over time, the accumulated fluid may hinder adjacent nozzles by blocking or deflecting fluid ejected from the adjacent nozzles. This may eventually cause all of the nozzles of a fluidic device to malfunction.

BRIEF SUMMARY

The present disclosure is directed to a fluidic ejection device configured to detect whether or not one or more nozzles of the fluidic ejection device is blocked or clogged. The fluidic ejection device includes an optical blockage detector having a light emitting device configured to emit a light signal, and a light sensor configured to detect the light signal. The optical blockage detector determines whether or not one or more nozzles of the fluidic ejection device is blocked based on the detected light signal.

Based on the detection results of the optical blockage detector, the fluidic ejection device may alter operation of the fluidic ejection device. For example, the fluidic ejection device may halt operation of the fluidic ejection device. Alternatively, the fluidic ejection device may stop utilization of a blocked nozzle, and select an alternate nozzle to eject fluid from. As a result, fluid ejection errors may be avoided. For example, for printing applications, degradation of printed text or images may be reduced. In addition, risk of accumulated fluid at a blocked nozzle, which may cause additional nozzles to malfunction, may be avoided.

The optical blockage detector may be used to detect blocked nozzles during various phases of the fluidic ejection device. For example, the optical blockage detector may be used during a manufacture phase to ensure that the fluidic ejection device is functioning properly before being deployed to a customer; during an operation phase (e.g., while the fluidic ejection device is ejecting fluid) to determine whether operation of the fluidic ejection device should be halted or adjusted; or during an idle phase (e.g., after the fluidic ejection device has finished ejecting fluid) to ensure that the fluidic ejection device is functioning properly for a subsequent ejection.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing fluidic devices, light emitting devices, light sensors, integrated circuits, counters, and electrical components (e.g., transistors, resistors, capacitors, etc.) have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Reference throughout the specification to integrated circuits is generally intended to include integrated circuit components built on semiconducting or glass substrates, whether or not the components are coupled together into a circuit or able to be interconnected. Throughout the specification, the term "layer" is used in its broadest sense to include a thin film, a cap, or the like, and one layer may be composed of multiple sub-layers.

It is noted that the dimensions set forth herein are provided as examples. Other dimensions are envisioned for this embodiment and all other embodiments of this application.

Figure 1:
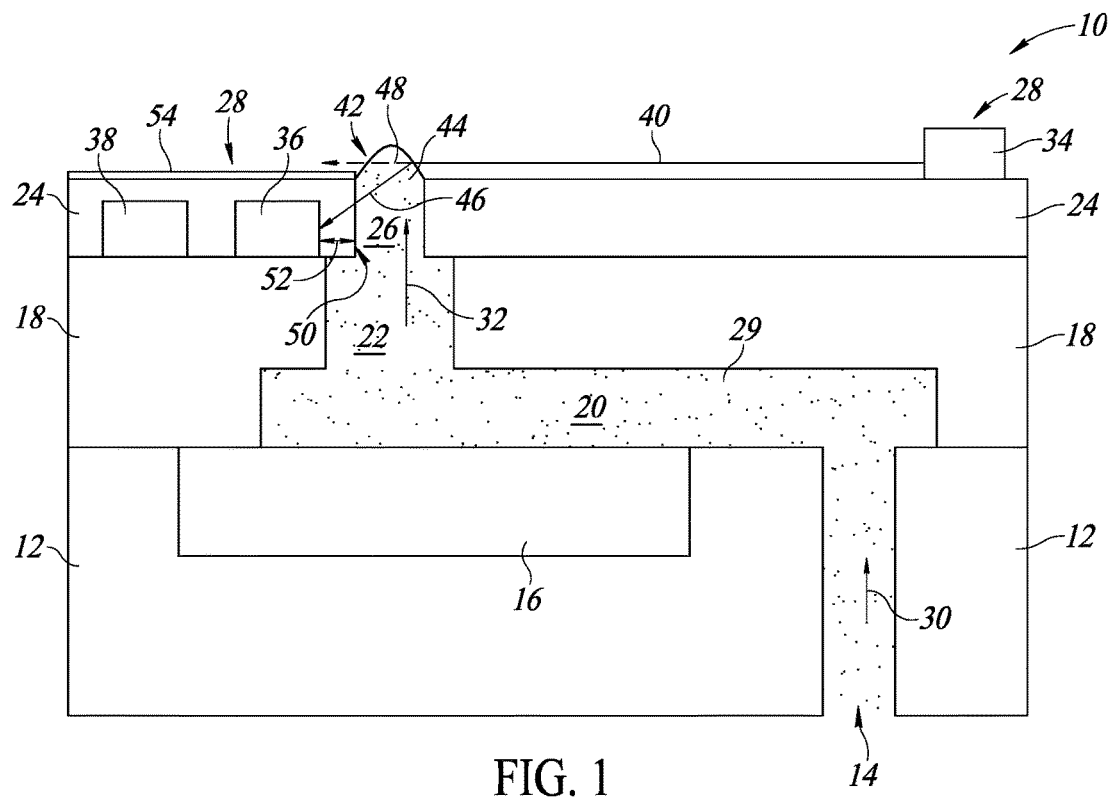
FIG. 1 is a cross-sectional view of a fluid ejection device according to an embodiment disclosed herein.

FIG. 1 is a cross-sectional view of a fluidic ejection device 10 according to an embodiment disclosed herein.

The fluidic ejection device 10 ejects fluid into a surrounding environment of the fluidic ejection device 10. The fluidic ejection device 10 may be used for a plurality of different applications. For example, the fluidic ejection device 10 may be included in a printer head for a printer, such as an inkjet printer and 3D printer, to dispense ink. As another example, the fluidic ejection device 10 may be included in a medical device to inject fluid, such as biological materials and drugs, into a patient. The fluidic ejection device 10 includes a substrate 12, an inlet 14, a fluid ejector 16, a first structural layer 18, a chamber 20, a feed channel 22, a second structural layer 24, a nozzle 26, an optical blockage detector 28, and a light shield 54.

The substrate 12 provides a platform for the fluidic ejection device 10. The substrate 12 may be made of any rigid material. In one embodiment, the substrate 12 include semiconductor material, such as silicon.

The inlet 14 is a through hole that extends through the substrate 12. The inlet 14 provides an input channel to receive fluid 29, such as ink, from a reservoir of the fluid 29. The inlet 14 is fluidically coupled to the reservoir and the chamber 20. The inlet 14 receives the fluid 29 from the reservoir, and outputs the fluid 29 into the chamber 20. The fluid 29 flows through the inlet 14 moves in a direction 30.

The fluid ejector 16 is in or on the substrate 12. The fluid ejector 16 ejects the fluid 29 stored in the chamber 20, through the feed channel 22, and out of the nozzle 26. Fluid flowing out of the chamber 20 moves in a direction 32. The fluid ejector 16 may be any ejection device configured to dispense fluid. In one embodiment, the fluid ejector 16 includes an actuator, such as a piezoelectric actuator, that pushes fluid out of the nozzle 26. In one embodiment, the fluid ejector 16 uses thermal techniques that heats fluid in the chamber 20 with a heating element until fluid is dispensed from the nozzle 26.

The first structural layer 18 is on the substrate 12. The first structural layer 18 provides structure for the chamber 20 and the feed channel 22. In one embodiment, the first structural layer 18 includes semiconductor material, such as silicon.

The chamber 20 is formed in the first structural layer 18. The chamber 20 is a cavity in the fluidic ejection device 10 that holds the fluid 29 received from the reservoir of the fluid 29. The chamber 20 is fluidically coupled to the inlet 14 and the feed channel 22. As discussed above, the fluid ejector 16 ejects the fluid 29 stored in the chamber 20, through the feed channel 22, and out of the nozzle 26 in the direction 32.

The feed channel 22 is formed in the first structural layer 18, and directly overlies the chamber 20. The feed channel 22 provides an output channel for dispensing the fluid 29 from in the chamber 20 and out of the nozzle 26. The feed channel 22 is fluidically coupled to the chamber 20 and the nozzle 26. The fluid 29 flowing through the feed channel 22 moves in the direction 32.

The second structural layer 24 is on the first structural layer 18. The second structural layer 24 provides structure for the nozzle 26. In one embodiment, the second structural layer 24 include semiconductor material, such as silicon.

The nozzle 26 is a through hole or opening that extends through the second structural layer 24. The nozzle 26 provides an output channel for dispensing the fluid 29 from the chamber 20 into a surrounding environment of the fluidic ejection device 10. The nozzle 26 is fluidically coupled to the feed channel 22 and the surrounding environment of the fluidic ejection device 10. The fluid 29 flowing out of the nozzle 26 moves in the direction 32.

As discussed above, the inlet 14 is fluidically coupled to the reservoir of the fluid 29 and the chamber 20, the chamber 20 is fluidically coupled to the inlet 14 and the feed channel 22, the feed channel 22 is fluidically coupled to the chamber 20 and the nozzle 26, and the nozzle 26 is fluidically coupled to the feed channel 22 and a surrounding environment. As a result, the reservoir, the inlet 14, the chamber 20, the feed channel 22, the nozzle 26, and the surrounding environment are fluidically coupled to each other.

The optical blockage detector 28 is in or on the second structural layer 24. The optical blockage detector 28 detects whether or not the nozzle 26 is blocked or clogged with the fluid 29. The optical blockage detector 28 includes a light emitting device 34, a light sensor 36, and control circuitry 38.

The light emitting device 34 emits a light signal 40 towards the nozzle 26. The light signal 40 travels from the light emitting device 34 towards a side 42 of the nozzle 26 that faces the surrounding environment of the fluidic ejection device 10. The light emitting device 34 may be any type of device that transmits light. In one embodiment, as will be discussed in further detail below, the light emitting device 34 is a light emitting diode (LED).

In one embodiment, the light emitting device 34 emits a light signal that is transparent to the fluid 29. Stated differently, the light emitting device 34 emits a light signal that is configured to transmit through the fluid 29 such that the light signal 40 is able to propagate through the fluid 29 and to the light sensor 36. In one embodiment, the light emitting device 34 emits an infrared light signal. In one embodiment, the light emitting device 34 emits a white light signal. Operation of the light emitting device 34 during detection of a blocked nozzle will be discussed in further detail below.

The light emitting device 34 may have multiple positions. In one embodiment, as shown in FIG. 1, the light emitting device 34 is positioned on the second structural layer 24. In one embodiment, the second structural layer 24 is a semiconductor substrate, and the light emitting device 34 is fabricated directly in the second structural layer 24. In one embodiment, the light emitting device 34 is positioned off of the fluidic ejection device 10 (e.g., the light emitting device 34 may be positioned off chip and elsewhere within a device housing the fluidic ejection device 10).

The light sensor 36 detects the light signal 40 emitted from the light emitting device 34. The light sensor 36 may be any type of device that detects light. In one embodiment, as will be discussed in further detail below, the light sensor 36 is a photodiode.

The strength of the light signal detected by the light sensor 36 is dependent on whether or not a droplet 44 of the fluid 29 is present in the nozzle 26 and on the side 42 of the nozzle 26. If the droplet 44 is present as shown in FIG. 1, the light signal 40 will refract at a surface of the droplet 44, and a refracted light signal 46 of the light signal 40 will transmit towards the light sensor 36. In this case, the light signal detected by the light sensor 36 (e.g., the refracted light signal 46) will be strong. Conversely, if the droplet 44 is not present, the light signal 40 will stay on its current path and continue as light signal 48. In this case, the light signal, if any, detected by the light sensor 36 will be weak. Accordingly, the strength of the light signal detected by the light sensor 36 indicates whether the droplet 44 of the fluid 29 is present, and can be used to determine whether or not the nozzle 26 is blocked or clogged. Operation of the light sensor 36 during detection of a blocked nozzle will be discussed in further detail below.

In one embodiment, the light sensor 36 is positioned on the first structural layer 18 and adjacent to the nozzle 26. In one embodiment, the second structural layer 24 is a semiconductor substrate, and the light sensor 36 is fabricated directly in the second structural layer 24.

In one embodiment, as shown in FIG. 1, the light emitting device 34 and the light sensor 36 are positioned on opposite sides of the nozzle 26. Stated differently, the light emitting device 34 is positioned on a first side of the nozzle 26, and the light sensor 36 is positioned on a second side, opposite to the first side, of the nozzle 26.

In one embodiment, the light sensor 36 is positioned flush with a sidewall 50 of the nozzle 26. In this embodiment, the light sensor 36 forms a portion of the sidewall 50 of the nozzle 26.

In one embodiment, a light receiving surface of the light sensor 36 (e.g., a side of the light sensor 36 that detects light) faces the sidewall 50 of the nozzle 26 and the light emitter 34.

In one embodiment, as shown in FIG. 1, the light sensor 36 is spaced from a sidewall 50 of the nozzle 26 by a distance 52. The distance 52 is set such that a light signal, such as the refracted light signal 46, is able to penetrate through the second structural layer 24 and reach the light sensor 36. For example, in one embodiment, the second structural layer 24 include semiconductor material, such as silicon. In this embodiment, light photons will penetrate and get absorbed the semiconductor material. The absorbed light photons will then generate a charge that is detectable by the light sensor 36. In one embodiment, the distance 52 is between 10 and 50 micrometers.

Covering the light sensor 36 with the second structural layer 24 and positioning the light sensor 36 away from the sidewall 50 of the nozzle 26 protects the light sensor 36 from being damaged. For example, during fabrication of the fluidic ejection device 10, the second structural layer 24 may protect the light sensor 35 from etchants used to form the nozzle 26. As another example, during operation of the fluidic ejection device 10, the second structural layer 24 may protect the light sensor 35 from the fluid 29 repeatedly moving through the nozzle 26.

The control circuitry 38 is electrically coupled to the fluid ejector 16, the light emitting device 34, and the light sensor 36.

The control circuitry 38 controls the fluidic ejection device 10 to eject the fluid 29 during operation of the fluid ejection device 10. During operation of the fluidic ejection device 10, the control circuitry 38 provides a control signal to the fluid ejector 16 to instruct the fluid ejector 16 to eject the fluid 29 stored in the chamber 20, through the feed channel, and out of the nozzle 26.

The control circuitry 38 also controls the fluidic ejection device 10 to detect a normal state, a blocked nozzle state, and an accumulated fluid state of the fluidic ejection device 10. During detection, the control circuitry 38 provides control signals (e.g., a drive signals) to the light emitting device 34 to instruct the light emitting device 34 to emit light signals (e.g., the light signal 40) towards the nozzle 26, and provides control signals to the light sensor 36 to instruct the light sensor 36 to detect the light signals emitted from the light emitting device 34. The control circuitry 38 then receives and reads electrical signals from the light sensor 36 via readout circuitry; and uses the electrical signals from the light sensor 36 to determine whether or not the fluidic ejection device 10 is in the normal state, the blocked nozzle state, or the accumulated fluid state. The detection of the normal state, the blocked nozzle state, and the accumulated fluid state; and the readout circuitry included in the control circuitry 38 will be discussed in further detail below.

The control circuitry 38 may have multiple positions. In one embodiment, as shown in FIG. 1, the control circuitry 38 is positioned on the first structural layer 18 and adjacent to the light sensor 36. In one embodiment, the second structural layer 24 is a semiconductor substrate, and the control circuitry 38 is fabricated directly in the second structural layer 24. In one embodiment, the control circuitry 38 is positioned off of the fluidic ejection device 10 (e.g., off chip).

The light shield 54 is on the second structural layer 24, and directly overlies the light sensor 36 and the control circuitry 38. The light shield 54 prevents light signals in the surrounding environment of the fluidic ejection device 10 from interfering with, for example, the refracted light signal 46. Thus, noise in a light signal measured by the light sensor 36 is reduced, and accuracy of the light sensor 36 is improved. In one embodiment, the light shield 54 is a conductive layer, such as a metal layer.

Although a single inlet 14, fluid ejector 16, chamber 20, feed channel 22, nozzle 26, and optical blockage detector 28 are shown in FIG. 1, the fluidic ejection device 10 may have other configurations with any number of inlets, fluid ejectors, feed channels, nozzles, and optical blockage detectors.

In one embodiment, the structure shown in FIG. 1 is repeated such that the fluidic ejection device 10 includes multiple inlets, fluid ejectors, chambers, feed channels, nozzles, and optical blockage detectors. In this embodiment, the fluidic ejection device 10 is able eject fluid from multiple nozzles at once, or switch between one or more nozzles of the multiple nozzles for ejecting fluid. Each of the optical blockage detectors detects whether or not a respective nozzle is blocked or clogged with the fluid.

In one embodiment, an inlet, fluid ejector, and chamber are shared between multiple feed channels, nozzles, and optical blockage detectors. In this embodiment, fluid ejected from the nozzles comes from the same chamber.

Figure 2:
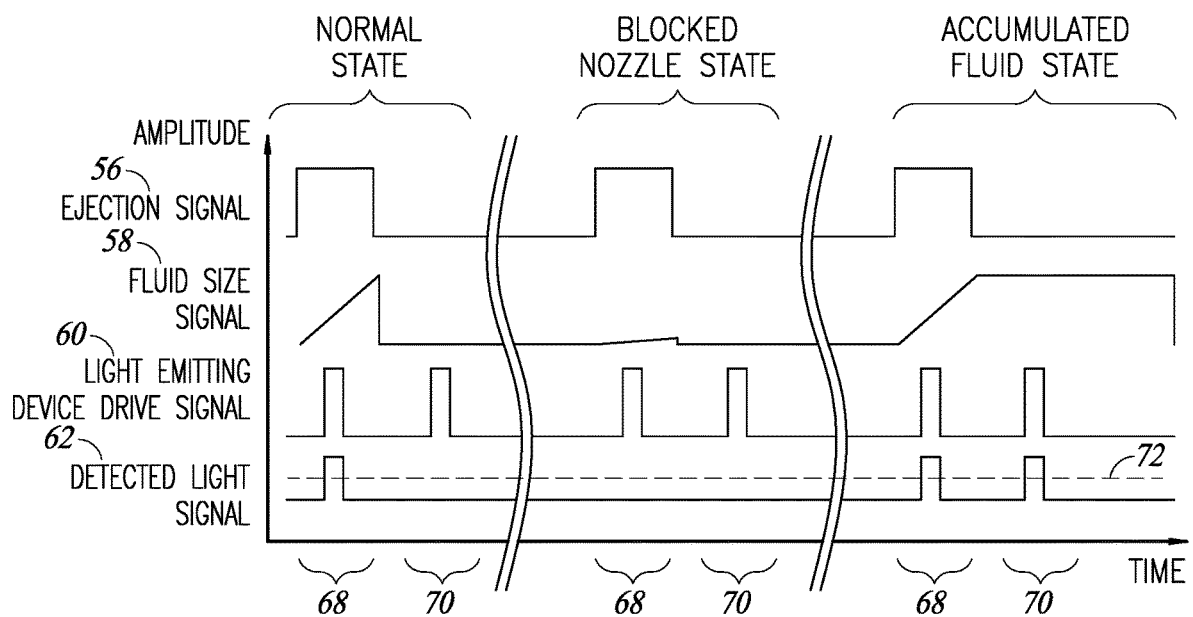
FIG. 2 is a diagram showing signals of a fluid ejection device during operation according to an embodiment disclosed herein.

The fluidic ejection device 10 is configured to determine whether the fluidic ejection device 10 is in a normal state, a blocked nozzle state, or an accumulated fluid state. FIG. 2 is a diagram showing signals of the fluidic ejection device 10 during operation according to an embodiment disclosed herein. Namely, FIG. 2 shows an ejection signal 56, a fluid size signal 58, a light emitting device drive signal 60, and a detected light signal 62 for the normal state, the blocked nozzle state, and the accumulated fluid state of the fluidic ejection device 10.

The ejection signal 56, fluid size signal 58, light emitting device drive signal 60, and detected light signal 62 are shown along a time axis (horizontal axis in FIG. 2) and an amplitude axis (vertical axis in FIG. 2). The time axis may have any time unit, such as nanoseconds, microseconds, milliseconds, seconds, etc. The amplitude axis may have any amplitude unit, such as volts, amps, etc.

The ejection signal 56 controls ejection of fluid from the fluidic ejection device 10. For example, the control circuitry 38 generates and provides the ejection signal 56 to the fluid ejector 16 to instruct the fluid ejector 16 to eject the fluid 29 out of the nozzle 26. In one embodiment, the fluid ejector 16 ejects the fluid 29 out of the nozzle 26 when the ejection signal 56 is in a high state (e.g., above a predetermined threshold), and does not eject the fluid 29 out of the nozzle 26 when the ejection signal 56 is in a low state (e.g., below a predetermined threshold). The ejection signal 56 may be any type of electrical signal, such as a voltage signal, current signal, etc.

The fluid size signal 58 indicates a size or an amount of fluid at or in a head of a nozzle detected by the fluidic ejection device 10. A large or high fluid size signal (e.g., above a predetermined threshold) indicates that fluid is present at or in a head of a nozzle, and a small or low fluid size signal (e.g., below a predetermined threshold) indicates that fluid is not present at or in a head of a nozzle. For example, a large or high fluid size signal 58 indicates that the droplet 44 of the fluid 29 is present at the nozzle 26. Conversely, a low or small fluid size signal 58 indicates that the droplet 44 of the fluid 29 is not present at the nozzle 26.

The light emitting device drive signal 60 controls the fluidic ejection device 10 to emit a light signal during detection of the normal state, the blocked nozzle state, and the accumulated fluid state. For example, the control circuitry 38 generates and provides the light emitting device drive signal 60 to the light emitting device 34 such that the light emitting device 34 to emits the light signal 40 towards the light sensor 36. In one embodiment, the light emitting device 34 emits the light signal 40 when the light emitting device drive signal 60 is in a high state (e.g., above a predetermined threshold), and does not emit the light signal 40 when the light emitting device drive signal 60 is in a low state (e.g., below a predetermined threshold). The light emitting device drive signal 60 may be any type of electrical signal, such as a voltage signal, current signal, etc.

The detected light signal 62 is a detected light signal by the fluidic ejection device 10 during detection of the normal state, the blocked nozzle state, and the accumulated fluid state. For example, the detected light signal 62 is the refracted light signal 46 of the light signal 40 detected by the light sensor 36. The detected light signal 62 indicates whether or not fluid is present at or in a nozzle. As discussed above, if the droplet 44 is present as shown in FIG. 1, the light signal 40 will refract at a surface of the droplet 44, and a refracted light signal 46 of the light signal 40 will transmit towards the light sensor 36. In this case, the detected light signal 62 will be large or high (e.g., above a predetermined threshold). Stated differently, the detected light signal will be large or high when the fluid detection the fluid size signal 58 is high. Conversely, if the droplet 44 is not present, the light signal 40 will stay on its current path and continue as light signal 48. In this case, the detected light signal 62 will be small or low (e.g., below a predetermined threshold). Stated differently, the detected light signal will be small or low when the fluid detection the fluid size signal 58 is low. The detected light signal 62 may be any type of electrical signal, such as a voltage signal, current signal, etc.

In the normal state, the fluidic ejection device 10 is functioning properly. For example, the fluidic ejection device 10 ejects fluid via the nozzle 26 when the fluid ejector 16 receives the ejection signal 56, and does not eject fluid via the nozzle 26 when the fluid ejector 16 does not receive the ejection signal 56. In the normal state, fluid is detected on the side 42 of the nozzle 26 when fluid is ejected via the nozzle 26 (i.e., when the fluid ejector 16 receives the ejection signal 56); and fluid is not detected on the side 42 of the nozzle 26 when fluid is not ejected via the nozzle 26 (i.e., when the fluid ejector 16 does not receive the ejection signal 56), as fluid is not stuck on or in the nozzle 26.

In the blocked nozzle state, the nozzle 26 is clogged with, for example, old fluid, and the fluid 29 is unable to eject out of the nozzle 26. For example, the fluidic ejection device 10 does not eject fluid out of the nozzle 26 when the fluid ejector 16 receives the ejection signal 56, and does not eject fluid via the nozzle 26 when the fluid ejector 16 does not receive the ejection signal 56. In the blocked nozzle state, fluid is not detected on the side 42 of the nozzle 26 when fluid is ejected via the nozzle 26 (i.e., when the fluid ejector 16 receives the ejection signal 56); and fluid is not detected on the side 42 of the nozzle 26 when fluid is not ejected via the nozzle 26 (i.e., when the fluid ejector 16 does not receive the ejection signal 56), as fluid is not stuck on or in the nozzle 26.

In the accumulated fluid state, fluid gathers in and/or on the nozzle 26. For example, the fluidic ejection device 10 may or may not eject fluid via the nozzle 26 when the fluid ejector 16 receives the ejection signal 56, and does not eject fluid via the nozzle 26 when the fluid ejector 16 does not receive the ejection signal 56. In the accumulated fluid state, fluid is still detected on the side 42 of the nozzle 26 when fluid is not ejected via the nozzle 26 (i.e., when the fluid ejector 16 does not receive the ejection signal 56). If the fluidic ejection device 10 is in the accumulated fluid state for prolonged periods of time, the accumulated fluid state may eventually lead to the blocked nozzle state.

The fluidic ejection device 10 determines whether a nozzle (e.g., the nozzle 26) is in the normal state, the blocked nozzle state, or the accumulated fluid state based on the detected light signal 62 during an ejection detection period 68, and the detected light signal 62 during a non-ejection detection period 70.

During the ejection detection period 68, the control circuitry 38 instructs ejection of fluid from the nozzle 26 (i.e., instructs the fluid ejection device 10 to eject fluid from the nozzle 26) and detects the detected light signal 62. For example, the control circuitry 38 provides the ejection signal 56 to the fluid ejector 16, provides the light emitting device drive signal 60 to the light emitting device 34, and detects the detected light signal 62. If the fluidic ejection device 10 is functioning properly, the detected light signal 62 indicates fluid is present at or in a head of a nozzle (e.g., the detected light signal 62 has a value above a predetermined threshold) during the first detection period.

During the non-ejection detection period 70, the control circuitry 38 does not instruct ejection of fluid from the nozzle 26 (i.e., instructs the fluid ejection device 10 to not eject fluid from the nozzle 26) and detects the detected light signal 62. For example, the control circuitry 38 does not provide the ejection signal 56 to the fluid ejector 16, but provides the light emitting device drive signal 60 to the light emitting device 34, and detects the detected light signal 62. If the fluidic ejection device 10 is functioning properly, the detected light signal 62 indicates fluid is not present at or in a head of a nozzle (i.e., the detected light signal 62 has a value below a predetermined threshold) during the second detection period.

The fluidic ejection device 10, specifically the control circuitry 38, determines a nozzle (e.g., the nozzle 26) is in the normal state in a case where (1) the detected light signal 62 indicates fluid is present at or in a head of a nozzle during the ejection detection period 68, and (2) the detected light signal 62 indicates fluid is not present at or in a head of the nozzle during the non-ejection period 70. For example, as shown in FIG. 2, the detected light signal 62 has a value above a predetermined threshold 72 during the ejection detection period 68, and has a value below the predetermined threshold 72 during the non-ejection detection period 70.

The fluidic ejection device 10, specifically the control circuitry 38, determines a nozzle (e.g., the nozzle 26) is in the blocked nozzle state in a case where (1) the detected light signal 62 indicates fluid is not present at or in a head of a nozzle during the ejection detection period 68, and (2) the detected light signal 62 indicates fluid is not present at or in a head of the nozzle during the non-ejection period 70. For example, as shown in FIG. 2, the detected light signal 62 has a value below the predetermined threshold 72 during the ejection detection period 68 and the non-ejection detection period 70.

The fluidic ejection device 10, specifically the control circuitry 38, determines a nozzle (e.g., the nozzle 26) is in the blocked nozzle state in a case where (1) the detected light signal 62 indicates fluid is present at or in a head of a nozzle during the ejection detection period 68, and (2) the detected light signal 62 indicates fluid is present at or in a head of the nozzle during the non-ejection period 70. For example, as shown in FIG. 2, the detected light signal 62 has a value above the predetermined threshold 72 during the ejection detection period 68 and the non-ejection detection period 70.

The control circuitry 38 adjusts operation of the fluidic ejection device 10 based on whether a nozzle (e.g., the nozzle 26) is in the normal state, the blocked nozzle state, or the accumulated fluid state.

In one embodiment, the control circuitry 38 continues operation of a nozzle determined to be in a normal state or in an accumulated fluid state.

In one embodiment, the control circuitry stops operation of the fluidic ejection device 10 (i.e., stops operation of all of the fluidic ejections device's 10 nozzles) in response to determining a predetermined number of nozzles (e.g., 1, 10, 50, or 100 nozzles) are in a blocked nozzle state or in an accumulated fluid state.

In one embodiment, the control circuitry 38 halts operation of a specific nozzle determined to be in a blocked nozzle state or in an accumulated fluid state, but continues operation of other nozzles in a normal state.

In one embodiment, the control circuitry 38 halts operation of a nozzle determined to be in a blocked nozzle state or in an accumulated fluid state, and activates a secondary nozzle (e.g., a nozzle not currently in use) to replace the nozzle in the blocked nozzle state or the accumulated fluid state.

By altering operation of the fluidic ejection device 10 based on whether one or more nozzles is in the normal state, the blocked nozzle state, or the accumulated fluid state, fluid ejection errors may be avoided. For example, for printing applications, degradation of printed text or images may be reduced. In addition, risk of accumulated fluid at a blocked nozzle causing additional nozzles to malfunction may be avoided.

The fluidic ejection device 10 may determine whether nozzles are in the normal state, the blocked nozzle state, or the accumulated fluid state during various operational phases of the fluidic ejection device. For example, the fluidic ejection device 10 may determine the state of one or more nozzles during a manufacture phase to ensure that the fluidic ejection device is functioning properly before being deployed to a customer. The fluidic ejection device 10 may also determine the state of one or more nozzles being used during an operational phase (e.g., while the fluidic ejection device is ejecting fluid) to determine whether operation of the fluidic ejection device should be halted or adjusted. Further, the fluidic ejection device 10 may determine the state of one or more nozzles during an idle phase (e.g., after the fluidic ejection device has finished ejecting fluid) to ensure that the fluidic ejection device is functioning properly for a subsequent ejection.

Figure 3:
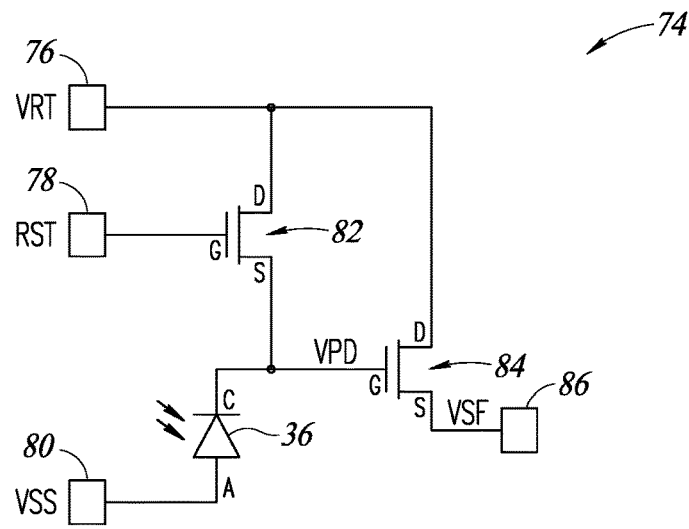
FIG. 3 shows readout circuitry according to an embodiment disclosed herein.

As discussed above, the control circuitry 38 receives and reads electrical signals from the light sensor 36 via readout circuitry; and uses the electrical signals from the light sensor 36 to determine whether or not the fluidic ejection device 10 is in the normal state, the blocked nozzle state, or the accumulated fluid state. FIG. 3 shows readout circuitry 74 according to an embodiment disclosed herein.

In one embodiment, the readout circuitry 74 is a part of the control circuitry 38. In one embodiment, the readout circuitry 74 is separate from the control circuitry 38 and positioned on the fluidic ejection device 10 (e.g., on the second structural layer 24 shown in FIG. 1). In one embodiment, the readout circuitry 74 is separate from the control circuitry 38 and positioned off of the fluidic ejection device 10 (e.g., off chip).

The readout circuitry 74 includes a first input 76, a second input 78, a third input 80, a first transistor 82, a second transistor 84, and an output 86. In the embodiment, as shown in FIG. 3, the light sensor 36 is a photodiode. Other types of light sensors are also possible.

The first input 76 is electrically coupled to the drain of the first transistor 82 and the drain of the second transistor 84. The first input 76 receives a first input signal VRT. The first input signal VRT may be any type of electrical signal, such as a voltage signal, current signal, etc.

The second input 78 is electrically coupled to the gate of the first transistor 82. The second input 78 receives a reset signal RST. The reset signal RST may be any type of electrical signal, such as a voltage signal, current signal, etc.

The third input 80 is electrically coupled to the anode of the light sensor 36. The third input 80 receives a second input signal VSS. The second input signal VSS may be any type of electrical signal, such as a voltage signal, current signal, etc. In one embodiment, the second input signal VSS is set to ground.

The drain of the first transistor 82 is electrically coupled to the first input 76 and the drain of the second transistor 84, the gate of the first transistor 82 is electrically coupled to the second input 78, and the source of the first transistor 82 is electrically coupled to the cathode of the light sensor 36. A first output signal VPD is output from the source of the first transistor 82. The first output signal VPD may be any type of electrical signal, such as a voltage signal, current signal, etc.

The drain of the second transistor 84 is electrically coupled to the drain of the first transistor 82 and the first input 76, the gate of the second transistor 84 is electrically coupled to the source of the first transistor 82 and the cathode of the light sensor 36, and the source of the second transistor 84 is electrically coupled to the output 86. The gate of the second transistor 84 receives the first output signal VPD. A second output signal VSF is output from the source of the second transistor 84. The second output signal VSF may be any type of electrical signal, such as a voltage signal, current signal, etc.

The output 86 is electrically coupled to the source of the second transistor 84. The output 86 receives the second output signal VSF, and outputs the second output signal VSF to processing circuitry to determine the detected light signal 62.

In one embodiment, the processing circuitry is a part of the control circuitry 38. In one embodiment, the processing circuitry is separate from the control circuitry 38 and positioned on the fluidic ejection device 10 (e.g., on the second structural layer 24 shown in FIG. 1). In one embodiment, the processing circuitry is separate from the control circuitry 38 and positioned off of the fluidic ejection device 10 (e.g., off chip).

In one embodiment, the processing circuitry includes sample and hold circuitry configured to sample a value of the second output signal VSF, and hold the sampled value of the second output signal VSF. The processing circuitry then determines the detected light signal 62 based on the sampled value. For example, in one embodiment, the processing circuitry outputs a detected light signal 62 having a large or high value (e.g., above a predetermined threshold) in response to the sampled value being below a predetermined threshold. Conversely, in one embodiment, the processing circuitry outputs a detected light signal 62 having a large or high value (e.g., above a predetermined threshold) in response to the sampled value being above a predetermined threshold.

In one embodiment, the processing circuitry includes an analog-digital converter configured to convert the output signal VSF from an analog signal to a digital signal. The processing circuitry then determines the detected light signal 62 based on the digital signal. For example, in one embodiment, the processing circuitry outputs a detected light signal 62 having a large or high value (e.g., above a predetermined threshold) in response to the digital signal having a low digital value (e.g., below a predetermined threshold). Conversely, in one embodiment, the processing circuitry outputs a detected light signal 62 having a large or high value (e.g., above a predetermined threshold) in response to the digital signal having a high digital value (e.g., above a predetermined threshold).

In one embodiment, the first input signal VRT, the reset signal RST, and the second input signal VSS is provided by the control circuitry 38, itself. For example, the control circuitry 38 generates and applies the first input signal VRT, the reset signal RST, and the second input signal VSS to the first input 76, the second input 78, and the third input 80, respectively. In one embodiment, the first input signal VRT, the reset signal RST, and the second input signal VSS is generated outside of the fluidic ejection device 10 (e.g., off chip). For example, circuitry outside of the fluidic ejection device 10 generates and applies the first input signal VRT, the reset signal RST, and the second input signal VSS to the first input 76, the second input 78, and the third input 80, respectively.

Figure 4:
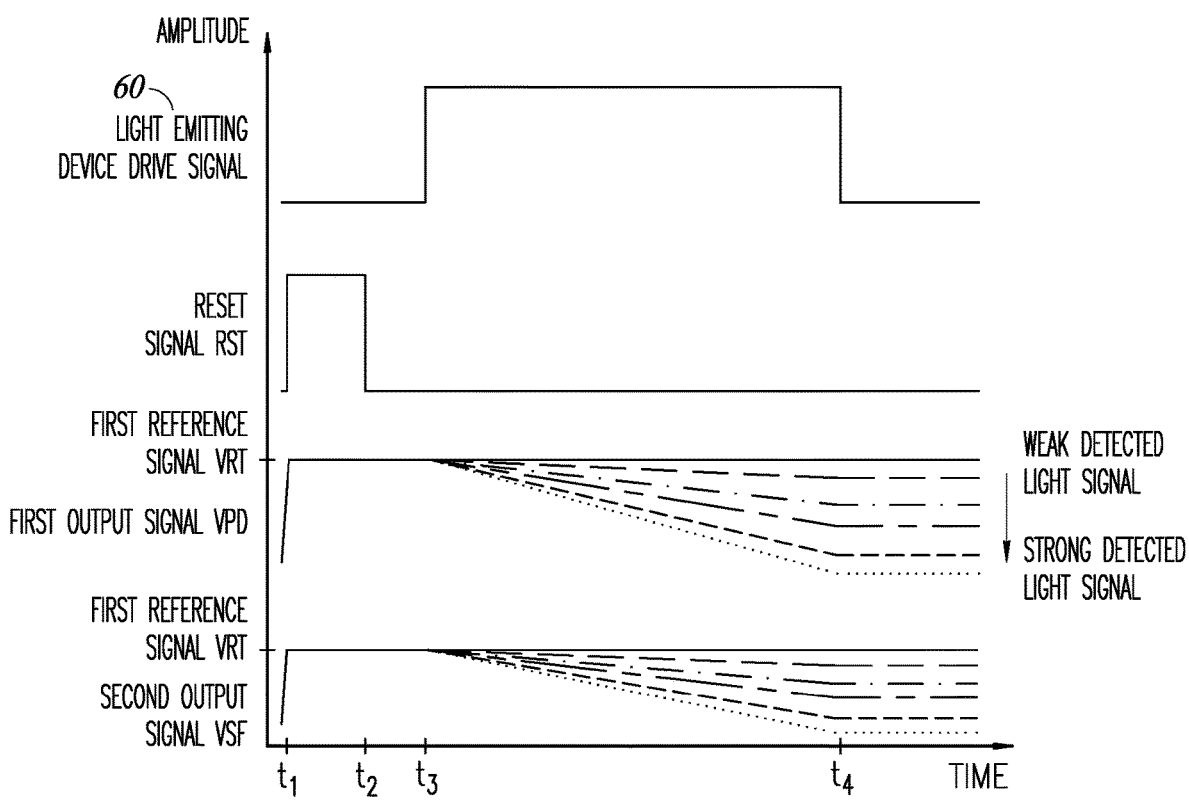
FIG. 4 is a diagram showing signals of the readout circuitry of FIG. 3 during measurement of a light signal according to an embodiment disclosed herein.

FIG. 4 is a diagram showing signals of the readout circuitry 74 during measurement of a light signal according to an embodiment disclosed herein. Namely, FIG. 4 shows the light emitting device drive signal 60, the reset signal RST, the first output signal VPD, and the second output signal VSF during measurement of a light signal (e.g., during the ejection detection period 68 and the non-ejection detection period 70).

The light emitting device drive signal 60, the reset signal RST, the first output signal VPD, and the second output signal VSF are shown along a time axis (horizontal axis in FIG. 4) and an amplitude axis (vertical axis in FIG. 4). The time axis may have any time unit, such as nanoseconds, microseconds, milliseconds, seconds, etc. The amplitude axis may have any amplitude unit, such as volts, amps, etc.

In the embodiment shown in FIG. 4, the second input signal VSS is set to ground.

Between time t1 and time t2, the fluidic ejection device 10 is prepared for measuring a light signal. The light emitting device drive signal 60 is set to a low state such that the light emitting device 34 does not emit the light signal 40. In one embodiment, the light emitting device drive signal 60 is between 0 and 3 volts. In addition, the reset signal RST is set to a high state to clear the readout circuitry 74 of any residual electrical signals from a previous measurement. In one embodiment, the reset signal RST is between 3 and 6 volts. The first output signal VPD has a constant value equal to the first input signal VRT. In one embodiment, the first input signal VRT is between 3 and 6 volts. The second output signal VSF follows the first output signal VPD but has a lower value than first output signal VPD. Thus, the second output signal VSF also has a constant value but is lower than the first output signal VPD. In one embodiment, the second output signal VSF is between 0.5 and 1 volt lower than the first output signal VPD.

Between time t2 and time t3, the amplitude values of the light emitting device drive signal 60, the first output signal VPD, and the second output signal VSF remain the same as between time t1 and time t2. However, at time t2, the reset signal RST is set to a low state. In one embodiment, the reset signal RST is between 0 and 3 volts.

Between time t3 and time t4, the fluidic ejection device 10 emits a light signal and measures the emitted light signal. The light emitting device drive signal 60 is set to a high state such that the light emitting device 34 emits the light signal 40. In one embodiment, the light emitting device drive signal 60 is between 3 and 6 volts. The reset signal RST remains the same as between time t2 and time t3.

Between time t3 and time t4, the amplitude value of the first output signal VPD changes depending on an amount of light detected by the light sensor 36. As discussed above, if the droplet 44 is not present, the light signal 40 will stay on its current path and continue as light signal 48. In this case, the light sensor 36, which in the embodiment shown in FIG. 3 is a photodiode, will not generate an electrical current, and the first output signal VPD will remain the same. Conversely, if the droplet 44 is present as shown in FIG. 1, the light signal 40 will refract at a surface of the droplet 44, and a refracted light signal 46 of the light signal 40 will transmit towards the light sensor 36. In this case, the light sensor 36 will generate an electrical current, and the first output signal VPD will gradually decrease.

The rate of decrease of the first output signal VPD is proportional to the strength of light detected by the light sensor 36. For example, FIG. 4 shows the first output signal VPD for six different light levels. As shown in FIG. 4, the rate of decrease of the first output signal VPD increases as the strength of light detected by the light sensor 36 increases.

As discussed above, the second output signal VSF follows the first output signal VPD but has a lower value than first output signal VPD. Thus, between time t3 and time t4, the second output signal VSF has the same shape as the first output signal VPD (e.g., gradually decreases with the first output signal VPD). In one embodiment, the second output signal VSF is between 0.5 and 1 volt lower than the first output signal VPD.

At time t4, the fluidic ejection device 10 stops emitting a light signal. The light emitting device drive signal 60 is set to a low state such that the light emitting device 34 does not emit the light signal 40. In one embodiment, the light emitting device drive signal 60 is between 0 and 3 volts. The reset signal RST remains the same as between time t2 and time t3. The first output signal VPD and the second output signal VSF hold their values at time t4.

The amplitude value of the second output signal VSF at time t4 is indicative of the amount of light detected by the light sensor 36, and, thus, is indicative of whether fluid is present at or in the head of the nozzle 26. For example, referring to FIG. 1, if the droplet 44 is not present, the light signal 40 will stay on its current path and continue as light signal 48. In this case, the strength of light detected by the light sensor 36 will be weak, and the second output signal VSF will be large or high (e.g., above a predetermined threshold). Conversely, if the droplet 44 is present as shown in FIG. 1, the light signal 40 will refract at a surface of the droplet 44, and a refracted light signal 46 of the light signal 40 will transmit towards the light sensor 36. In this case, the strength of light detected by the light sensor 36 will be strong, and the second output signal VSF will be small or low (e.g., below a predetermined threshold).

As discussed above, in one embodiment, the structure shown in FIG. 1 is repeated such that the fluidic ejection device 10 includes multiple inlets, fluid ejectors, chambers, feed channels, nozzles, and optical blockage detectors. Each of the optical blockage detectors detects whether or not a respective nozzle is blocked or clogged with the fluid. In this embodiment, the readout circuitry 74 shown in FIG. 3 is repeated for each of the optical blockage detectors. Stated differently, the fluidic ejection device 10 includes a plurality of the readout circuitry that are in one-to-one correspondence with the plurality of optical blockage detectors, and, thus, are in one-to-one correspondence with the plurality of nozzles. In one embodiment, the plurality of readout circuitry are arranged in parallel to each other.

Figure 5:
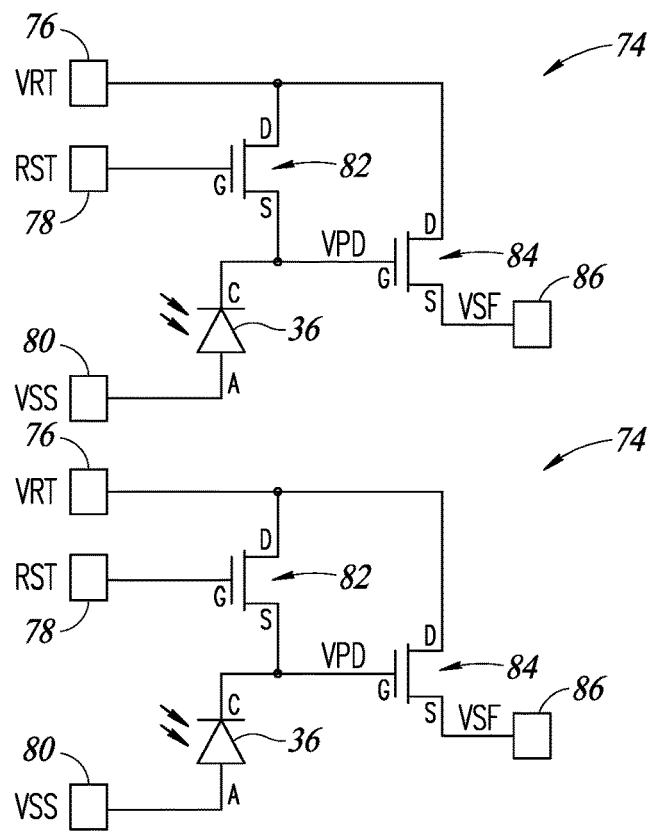
FIG. 5 shows a plurality of the readout circuitry of FIG. 3 according to an embodiment disclosed herein.

FIG. 5 shows a plurality of the readout circuitry 74 according to an embodiment disclosed herein. In the embodiment shown in FIG. 5, two readout circuits 74 are shown. Each of the two readout circuits 74 receives and reads electrical signals from a respective optical blockage detector, more specifically a respective light sensor. Each of the readout circuits 74 have the same configuration and components as the readout circuitry 74 shown in FIG. 3.

The readout circuits 74 are arranged in parallel. Namely, each of the two readout circuits 74 output the second output signal VSF from the output 86. The second output signals VSF are output separately and in parallel with each other.

Although two readout circuits 74 are shown in FIG. 5, the fluidic ejection device 10 may include any number of readout circuits. In one embodiment, the fluidic ejection device 10 includes a readout circuit for each nozzle (i.e., the number of readout circuits in the fluidic ejection device 10 is equal to the number of nozzles in the fluidic ejection device 10).

Figure 6:
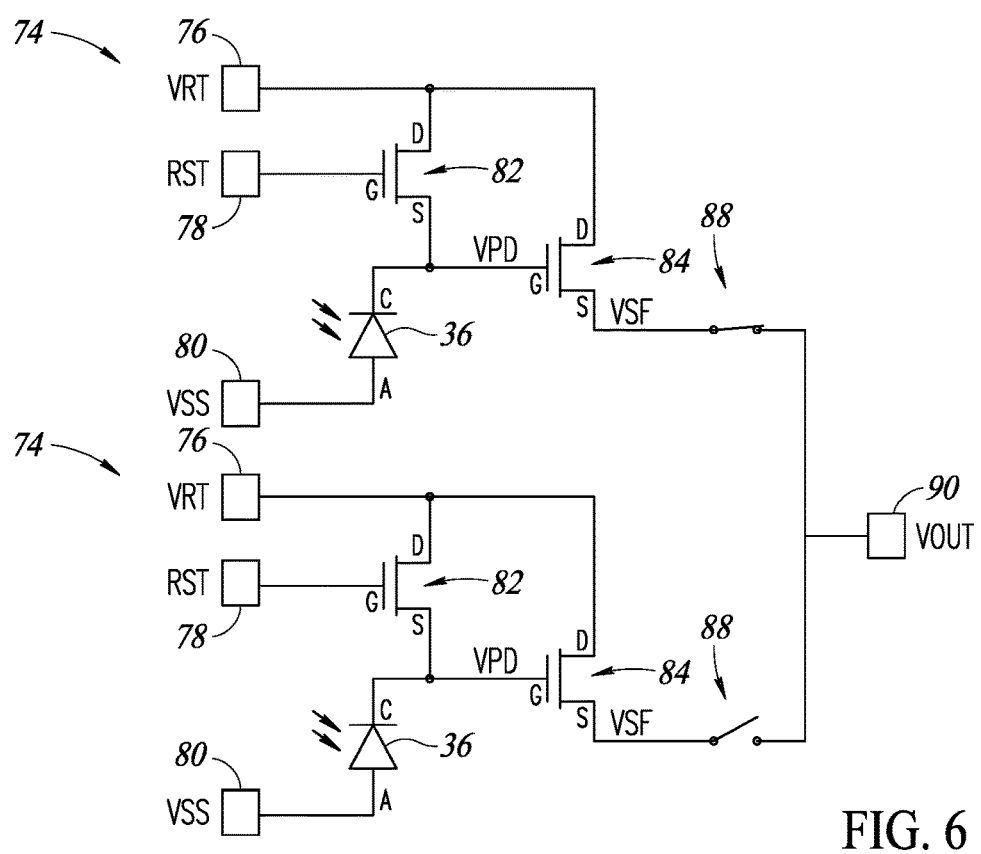
FIG. 6 shows a plurality of readout circuitry of FIG. 3 according to another embodiment disclosed herein.

FIG. 6 shows a plurality of the readout circuitry 74 according to another embodiment disclosed herein. The embodiment shown in FIG. 6 is similar to the embodiment shown in FIG. 5. For example, each of the two readout circuits 74 output the second output signal VSF separately and in parallel with each other. However, in contrast to the embodiment shown in FIG. 5, the second output signals VSF of the two readout circuitry 74 are multiplexed and electrically coupled to a single output 90.

As shown in FIG. 6, the source of each of the second transistors 84 is electrically coupled to a switch 88. The switches 88 are opened and closed to electrically couple and decouple the readout circuitry 74 and the output 90. When the switch 88 is closed, the second output signal VSF is transmitted to the output 90 via the switch 88 and is output as signal VOUT. For example, referring to FIG. 6, the switch 88 for the upper readout circuitry 74 is in a closed state. Thus, the second output signal VSF for the upper readout circuitry 74 will be outputted out of the output 90 as the signal VOUT. When the switch 88 is opened, the second output signal VS is not transmitted to the output 90. For example, referring to FIG. 6, the switch 88 for the lower readout circuitry 74 is in an opened state. Thus, the second output signal VSF for the lower readout circuitry 74 will not be outputted out of the output 90. Accordingly, the second output signals VSF of the plurality of readout circuitry 74 may be multiplexed by switching the switches 88 between open and closed states. The switches 88 may be any type of switching component. For example, in one embodiment, the switches 88 are implemented using transistors.

Figure 7:
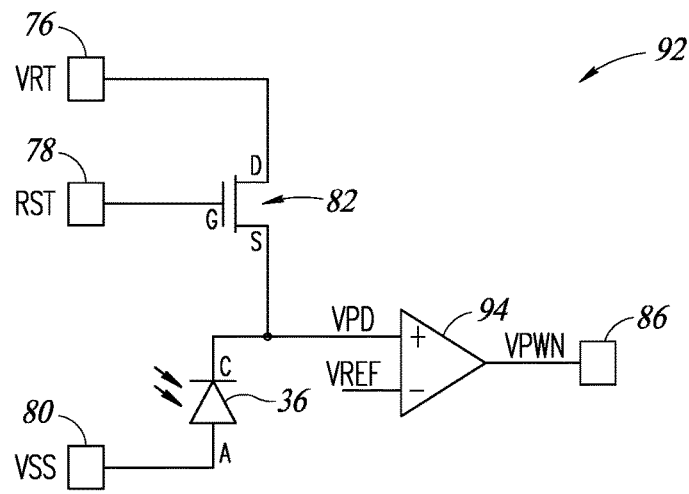
FIG. 7 shows readout circuitry according to another embodiment disclosed herein.

FIG. 7 shows readout circuitry 92 according to another embodiment disclosed herein. Similar to the readout circuitry 74 shown in FIG. 3, the readout circuitry 92 includes the first input 76, the second input 78, the third input 80, the first transistor 82, and the output 86. However, in contrast to the readout circuitry 74, the readout circuitry 92 includes an operational amplifier 94 instead of the second transistor 84. The operational amplifier 94 is electrically coupled to the first transistor 82 and the output 86.

The non-inverting input (+) of the operational amplifier 94 is electrically coupled to the source of the first transistor 82. The non-inverting input receives the first output signal VPD from the source of the first transistor 82.

The inverting input (−) of the operational amplifier 94 receives a reference signal VREF. The reference signal VREF may be any type of electrical signal, such as a voltage signal, current signal, etc. The reference signal VREF is used to set a threshold value for switching the third output signal VPWM from a low state to a high state.

In one embodiment, the reference signal VREF is provided by the control circuitry 38, itself. For example, the control circuitry 38 generates and applies the reference signal VREF to the inverting input of the operational amplifier 94. In one embodiment, the reference signal VREF is generated outside of the fluidic ejection device 10 (e.g., off chip). For example, circuitry outside of the fluidic ejection device 10 generates and applies the reference signal VREF to the inverting input of the operational amplifier 94.

The output of the operational amplifier 94 is electrically coupled to the output 86. A third output signal VPWM is output from the operational amplifier 94 to the output 86. The third output signal VPWM may be any type of electrical signal, such as a voltage signal, current signal, etc.

The amplitude of the third output signal VPWM depends on the first output signal VPD and the reference signal VREF. The third output signal VPWM is set to a low state when the first output signal VPD is greater than the reference signal VREF, and is set to a high state when the first output signal VPD is equal to or less than the reference signal VREF. In one embodiment, the third output signal VPWM is between 0 and 3 volts in the low state. In one embodiment, third output signal VPWM is between 3 and 6 volts in the high state. In one embodiment, the reference signal VREF is between 2 and 4 volts.

Figure 8:
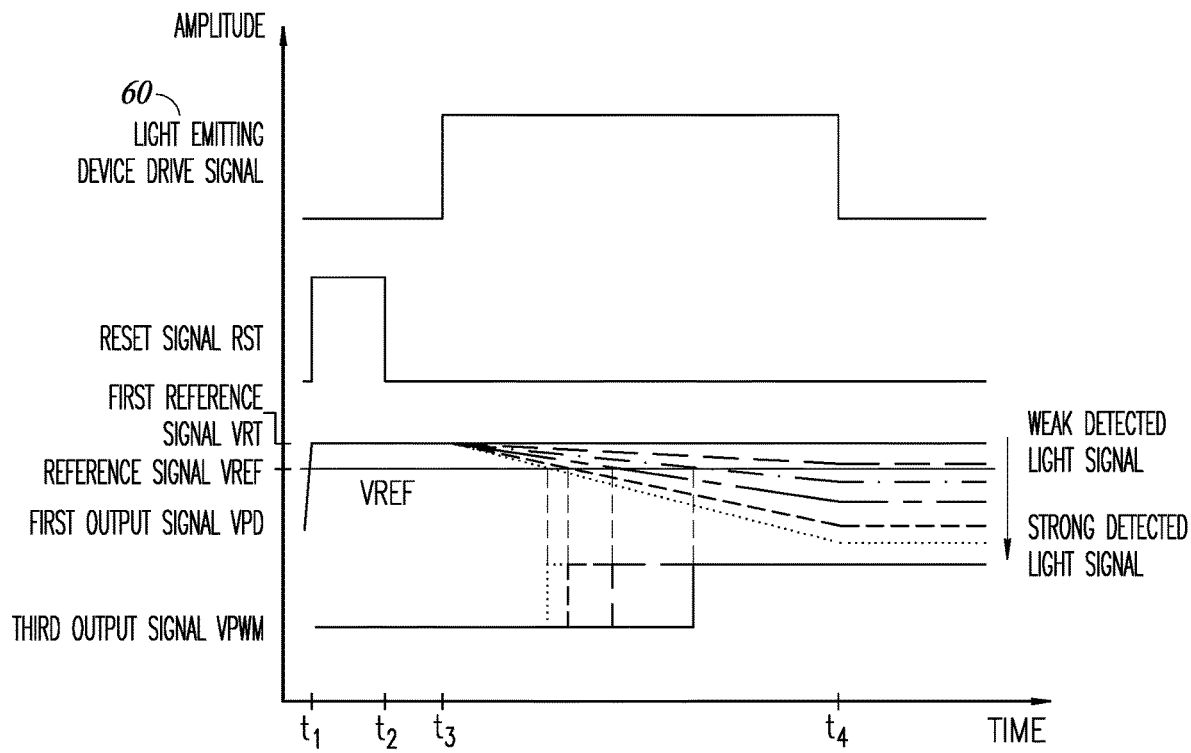
FIG. 8 is a diagram showing signals of the readout circuitry of FIG. 7 during measurement of a light signal according to an embodiment disclosed herein.

FIG. 8 is a diagram showing signals of the readout circuitry 92 during measurement of a light signal according to an embodiment disclosed herein. Namely, FIG. 8 shows the light emitting device drive signal 60, the reset signal RST, the first output signal VPD, and the third output signal VPWM during measurement of a light signal (e.g., during the ejection detection period 68 and the non-ejection detection period 70).

The light emitting device drive signal 60, the reset signal RST, the first output signal VPD, and the third output signal VPWM are shown along a time axis (horizontal axis in FIG. 8) and an amplitude axis (vertical axis in FIG. 8). The time axis may have any time unit, such as nanoseconds, microseconds, milliseconds, seconds, etc. The amplitude axis may have any amplitude unit, such as volts, amps, etc.

In the embodiment shown in FIG. 8, the second input signal VSS is set to ground. In addition, the amplitude of the reference signal VREF is less than the amplitude of the first reference signal VRT. In one embodiment, as shown in FIG. 8, the reference signal VREF is kept at a constant value during the measurement of the light signal.

Between time t1 and time t2, as discussed above, the fluidic ejection device 10 is prepared for measuring a light signal. Between time t1 and time t2, the light emitting device drive signal 60 is set to a low state such that the light emitting device 34 does not emit the light signal 40, the reset signal RST is set to a high state to clear the readout circuitry 74 of any residual electrical signals from a previous measurement, and the first output signal VPD has a constant value equal to the first input signal VRT. The third output signal VPWM is in the low state because the first output signal VPD is greater than the reference signal VREF between time t1 and time t2.

Between time t2 and time t3, the amplitude values of the light emitting device drive signal 60, the first output signal VPD, and the third output signal VPWM remain the same as between time t1 and time t2. However, at time t2, the reset signal RST is set to a low state. In one embodiment, the reset signal RST is between 0 and 3 volts.

Between time t3 and time t4, as discussed above, the fluidic ejection device 10 emits a light signal and measures the emitted light signal. The light emitting device drive signal 60 is set to a high state such that the light emitting device 34 emits the light signal 40. The reset signal RST remains the same as between time t2 and time t3.

The amplitude value of the first output signal VPD between time t3 and time t4 changes depending on an amount of light detected by the light sensor 36. As discussed above, if the droplet 44 is not present, the light signal 40 will stay on its current path and continue as light signal 48. In this case, the light sensor 36, which in the embodiment shown in FIG. 7 is a photodiode, will not generate an electrical current, and the first output signal VPD will remain the same. Conversely, if the droplet 44 is present as shown in FIG. 1, the light signal 40 will refract at a surface of the droplet 44, and a refracted light signal 46 of the light signal 40 will transmit towards the light sensor 36. In this case, the light sensor 36 will generate an electrical current, and the first output signal VPD will gradually decrease.

The rate of decrease of the first output signal VPD is proportional to the strength of light detected by the light sensor 36. For example, FIG. 8 shows the first output signal VPD for six different light levels. As shown in FIG. 8, the rate of decrease of the first output signal VPD increases as the strength of light detected by the light sensor 36 increases.

As discussed above, the third output signal VPWM switches from the low state to a high state when the first output signal VPD is equal to or less than the reference signal VREF. For example, FIG. 8 shows four third output signals VPWM corresponding to four first output signals VPD that drop below the reference signal VREF.

At time t4, as discussed above, the fluidic ejection device 10 stops emitting a light signal. The light emitting device drive signal 60 is set to a low state such that the light emitting device 34 does not emit the light signal 40. The reset signal RST remains the same as between time t2 and time t3. The first output signal VPD and the third output signal VPWM hold their values at time t4.

The amplitude value of the third output signal VPWM at time t4 is indicative of the amount of light detected by the light sensor 36, and, thus, is indicative of whether fluid is present at or in the head of the nozzle 26. For example, referring to FIG. 1, if the droplet 44 is not present, the light signal 40 will stay on its current path and continue as light signal 48. In this case, the strength of light detected by the light sensor 36 will be weak, and the third output signal VPWM will be large or high (e.g., above the reference signal VREF). Conversely, if the droplet 44 is present as shown in FIG. 1, the light signal 40 will refract at a surface of the droplet 44, and a refracted light signal 46 of the light signal 40 will transmit towards the light sensor 36. In this case, the strength of light detected by the light sensor 36 will be strong, and the third output signal VPWM will be small or low (e.g., below the reference signal VREF).

As discussed with respect to FIGS. 5 and 6, readout circuitry may be repeated for each of a plurality of optical blockage detectors.

Figure 9:
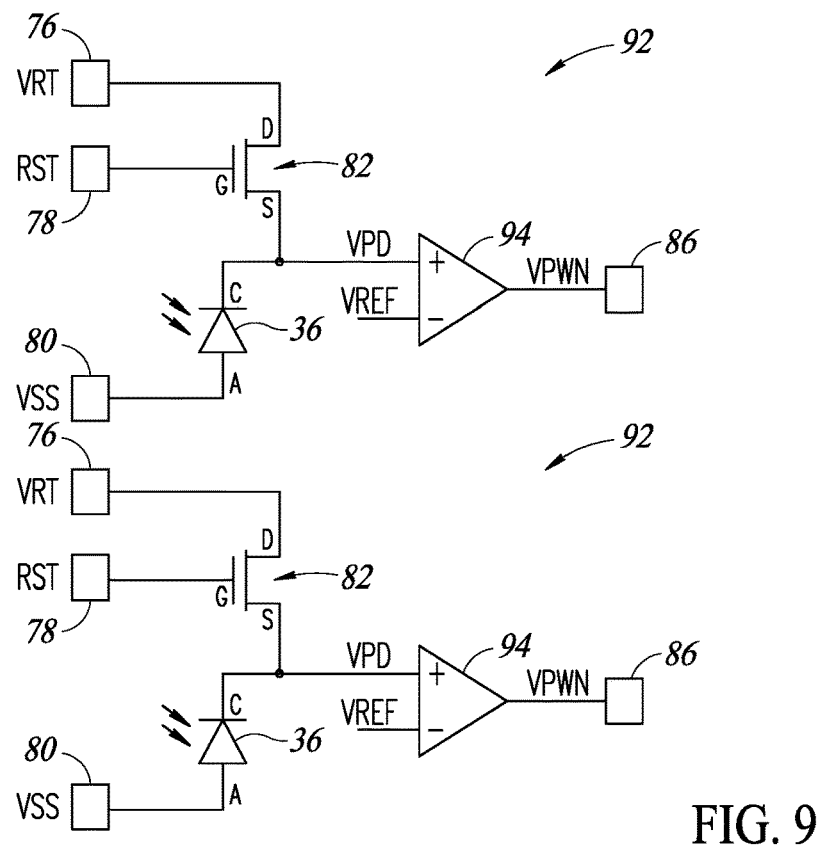
FIG. 9 shows a plurality of the readout circuitry of FIG. 7 according to an embodiment disclosed herein.

FIG. 9 shows a plurality of the readout circuitry 92 according to an embodiment disclosed herein. Similar to the embodiment shown in FIG. 5, two readout circuits 92 are shown. Each of the two readout circuits 92 receives and reads electrical signals from a respective optical blockage detector, more specifically a respective light sensor. Each of the readout circuits 92 have the same configuration and components as the readout circuitry 92 shown in FIG. 7.

The readout circuits 92 are arranged in parallel. Namely, each of the two readout circuits 92 output the third output signal VPWM from the output 86. The third output signal VPWM are output separately and in parallel with each other.

Although two readout circuits 92 are shown in FIG. 9, the fluidic ejection device 10 may include any number of readout circuits. In one embodiment, the fluidic ejection device 10 includes a readout circuit for each nozzle (i.e., the number of readout circuits in the fluidic ejection device 10 is equal to the number of nozzles in the fluidic ejection device 10).

Figure 10:
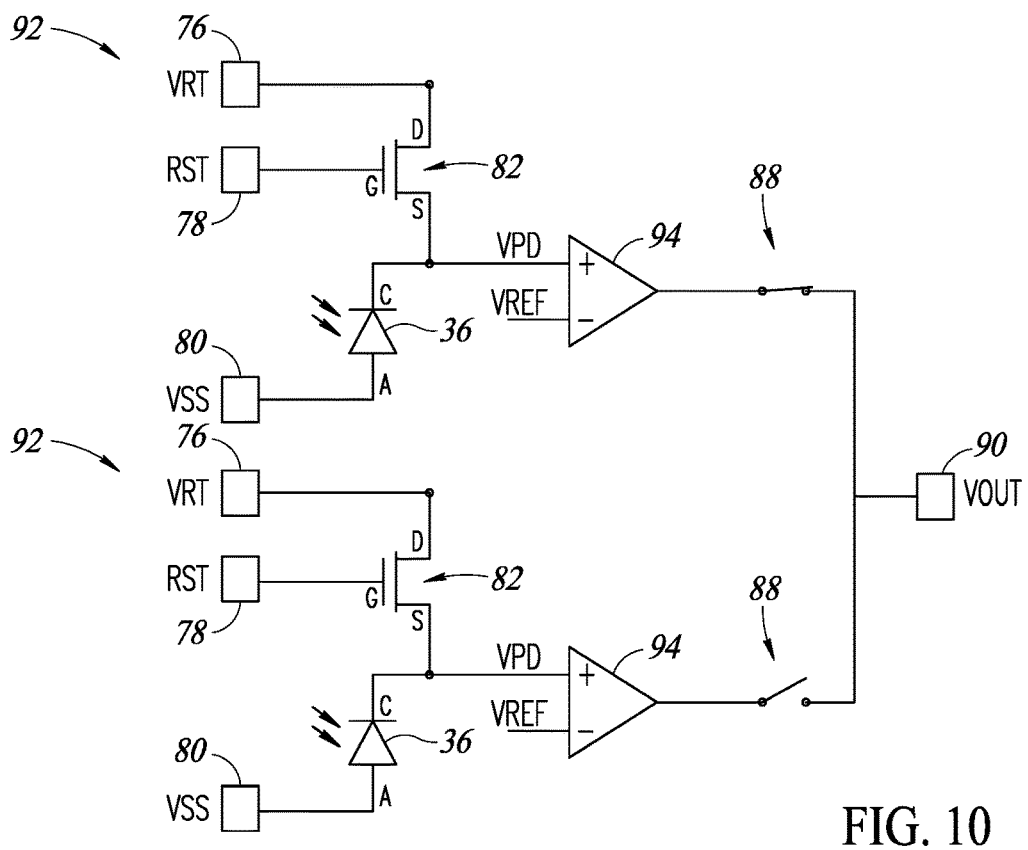
FIG. 10 shows a plurality of readout circuitry of FIG. 7 according to another embodiment disclosed herein.

FIG. 10 shows a plurality of readout circuitry 92 according to another embodiment disclosed herein. The embodiment shown in FIG. 10 is similar to the embodiment shown in FIG. 9. For example, each of the two readout circuits 92 output the third output signal VPWM separately and in parallel with each other. However, in contrast to the embodiment shown in FIG. 9, the third output signals VPWM of the two readout circuitry 92 are multiplexed and electrically coupled to a single output 90.

As shown in FIG. 10, the output of each of the operational amplifiers 94 is electrically coupled to a switch 88. The switches 88 are opened and closed to electrically couple and decouple the readout circuitry 92 and the output 90. When the switch 88 is closed, the third output signal VPWM is transmitted to the output 90 via the switch 88 and is output as signal VOUT. For example, referring to FIG. 10, the switch 88 for the upper readout circuitry 74 is in a closed state. Thus, the second output signal VSF for the upper readout circuitry 92 will be outputted out of the output 90 as the signal VOUT. When the switch 88 is opened, the third output signal VPWM is not transmitted to the output 90. For example, referring to FIG. 6, the switch 88 for the lower readout circuitry 92 is in an open state. Thus, the third output signal VPWM for the lower readout circuitry 92 will not be outputted out of the output 90. Accordingly, the third output signals VPWM of the plurality of readout circuitry 92 may be multiplexed by switching the switches 88 between open and closed states. The switches 88 may be any type of switching component. For example, in one embodiment, the switches 88 are implemented using transistors.

Figure 11:
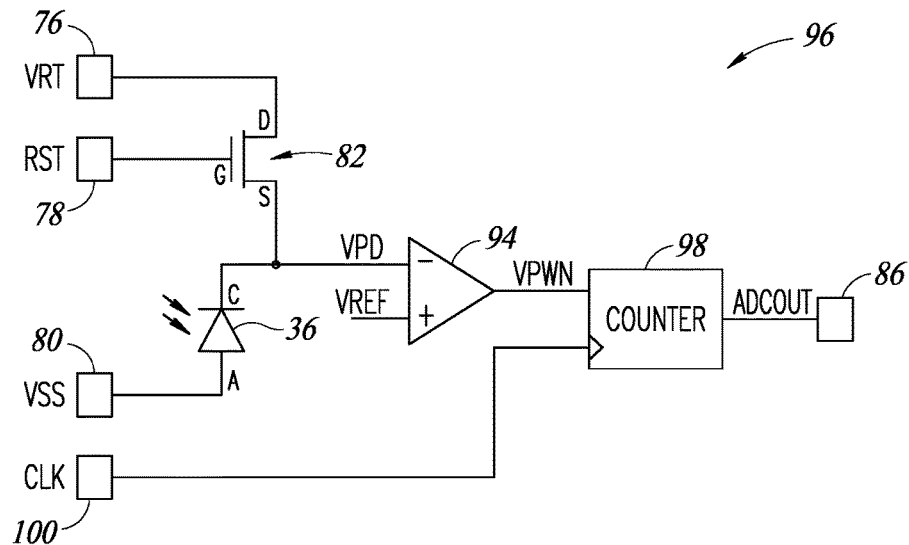
FIG. 11 shows readout circuitry according to another embodiment disclosed herein.

FIG. 11 shows readout circuitry 96 according to another embodiment disclosed herein. Similar to the readout circuitry 92 shown in FIG. 7, the readout circuitry 96 includes the first input 76, the second input 78, the third input 80, the first transistor 82, the output 86, and the operational amplifier 94. However, in contrast to the readout circuitry 92, the inputs of the operational amplifier 94 are switched with each other. Namely, the inverting input (−) is electrically coupled to the source of the first transistor 82, and receives the first output signal VPD from the source of the first transistor 82; and the non-inverting input (+) receives the reference signal VREF. In addition, the readout circuitry 96 includes a counter 98 positioned between the operational amplifier 94 and the output 86.

As the inverting input (−) receives the first output signal VPD and the non-inverting input receives the reference signal VREF, in the embodiment shown in FIG. 11, the third output signal VPWM is set to a low state when the first output signal VPD is less than the reference signal VREF, and is set to a high state when the first output signal VPD is equal to or greater than the reference signal VREF.

The counter 98 is electrically coupled to the operational amplifier 94. The counter 98 receives the third output signal VPWM from the operational amplifier 94, and receives a clock signal CLK received at input 100.

The clock signal CLK is used by the counter 98 to increment a count. In one embodiment, the counter 98 increments a count every rising edge of the clock signal CLK. In one embodiment, the counter 98 increments a count every falling edge of the clock signal CLK.

In one embodiment, the clock signal CLK is provided by the control circuitry 38, itself. For example, the control circuitry 38 generates and applies the clock signal CLK to the counter 98. In one embodiment, the clock signal CLK is generated outside of the fluidic ejection device 10 (e.g., off chip). For example, circuitry outside of the fluidic ejection device 10 generates and applies the clock signal CLK to the counter 98.

The counter 98 outputs a count value ADCOUT to the output 86. In one embodiment, the count value ADCOUT is a digital value. The count value ADCOUT is proportional to the amount of light detected by the light sensor 36, and, thus, is proportional to an amount of fluid present at or in the head of the nozzle 26. For example, a larger count value (e.g., hexadecimal value C) represents a large amount of light detected by the light sensor 36, and, thus, a large amount of fluid present at or in the head of the nozzle 26. Conversely, a small count (e.g., hexadecimal value 2) represents a small amount of light detected by the light sensor 36, and, thus, a small amount of fluid present at or in the head of the nozzle 26. As will be discussed in further detail below, the count value ADCOUT is generated based on the third output signal VPWM.

Figure 12:
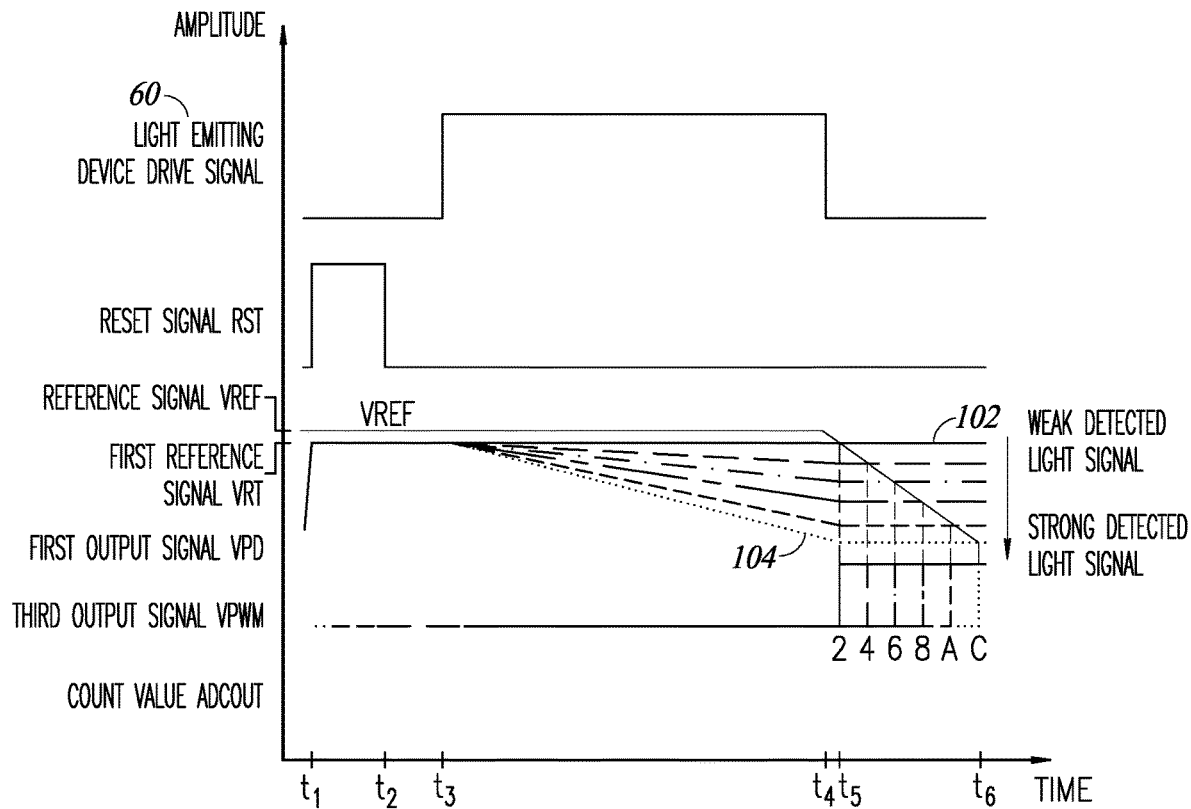
FIG. 12 is a diagram showing signals of the readout circuitry of FIG. 11 during measurement of a light signal according to an embodiment disclosed herein.

FIG. 12 is a diagram showing signals of the readout circuitry 96 during measurement of a light signal according to an embodiment disclosed herein. Namely, FIG. 12 shows the light emitting device drive signal 60, the reset signal RST, the first output signal VPD, the third output signal VPWM, and the count value ADCOUT during measurement of a light signal (e.g., during the ejection detection period 68 and the non-ejection detection period 70).

The light emitting device drive signal 60, the reset signal RST, the first output signal VPD, and the third output signal VPWM are shown along a time axis (horizontal axis in FIG. 12) and an amplitude axis (vertical axis in FIG. 12). The time axis may have any time unit, such as nanoseconds, microseconds, milliseconds, seconds, etc. The amplitude axis may have any amplitude unit, such as volts, amps, etc. The count value ADCOUT is a digital value and is shown along the time axis.

In the embodiment shown in FIG. 12, the second input signal VSS is set to ground.

In contrast to the embodiment shown in FIG. 8, the reference signal VREF is not kept at a constant value during the measurement of the light signal. As shown in FIG. 12, between time t1 and time t4, the amplitude of the reference signal VREF kept at a constant level that is greater than the amplitude of the first reference signal VRT. Subsequently, at time t4, the reference signal VREF ramps downward to zero. In one embodiment, as shown in FIG. 12, the amplitude of the reference signal VREF decreases linearly to zero. As will be discussed in further detail below, the reference signal VREF is used in conjunction with the counter 98 to provide a count value ADCOUT that is proportional to the amount of light detected by the light sensor 36.

Between time t1 and time t2, as discussed above, the fluidic ejection device 10 is prepared for measuring a light signal. Between time t1 and time t2, the light emitting device drive signal 60 is set to a low state such that the light emitting device 34 does not emit the light signal 40, the reset signal RST is set to a high state to clear the readout circuitry 74 of any residual electrical signals from a previous measurement, and the first output signal VPD has a constant value equal to the first input signal VRT. The third output signal VPWM is in the low state because the first output signal VPD is less than the reference signal VREF between time t1 and time t2.

Between time t2 and time t3, the amplitude values of the light emitting device drive signal 60, the first output signal VPD, and the third output signal VPWM remain the same as between time t1 and time t2. However, at time t2, the reset signal RST is set to a low state. In one embodiment, the reset signal RST is between 0 and 3 volts.

Between time t3 and time t4, as discussed above, the fluidic ejection device 10 emits a light signal and measures the emitted light signal. The light emitting device drive signal 60 is set to a high state such that the light emitting device 34 emits the light signal 40. The reset signal RST and the third output signal VPWM remain the same as between time t2 and time t3.

The amplitude value of the first output signal VPD between time t3 and time t4 changes depending on an amount of light detected by the light sensor 36. As discussed above, if the droplet 44 is not present, the light signal 40 will stay on its current path and continue as light signal 48. In this case, the light sensor 36, which in the embodiment shown in FIG. 7 is a photodiode, will not generate an electrical current, and the first output signal VPD will remain the same. Conversely, if the droplet 44 is present as shown in FIG. 1, the light signal 40 will refract at a surface of the droplet 44, and a refracted light signal 46 of the light signal 40 will transmit towards the light sensor 36. In this case, the light sensor 36 will generate an electrical current, and the first output signal VPD will gradually decrease.

As discussed above, the rate of decrease of the first output signal VPD is proportional to the strength of light detected by the light sensor 36. For example, FIG. 12 shows the first output signal VPD for six different light levels. As shown in FIG. 12, the rate of decrease of the first output signal VPD increases as the strength of light detected by the light sensor 36 increases.

At time t4, as discussed above, the fluidic ejection device 10 stops emitting a light signal. The light emitting device drive signal 60 is set to a low state such that the light emitting device 34 does not emit the light signal 40. The reset signal RST remains the same as between time t2 and time t3. The first output signal VPD hold its value at time t4.

In contrast to the embodiment shown in FIG. 8, the amplitude of the reference signal VREF begins decreasing at time t4. In one embodiment, as shown in FIG. 12, the amplitude of the reference signal VREF is decreased linearly to zero.

As discussed above, the third output signal VPWM switches from the low state to a high state when the first output signal VPD is equal to or greater than the reference signal VREF. As the reference signal VREF begins decreasing at time t4, the timing of the third output signal VPWM switching to the high state depends on the amplitude of the first output signal VPD held at time t4. For example, FIG. 12 shows the first output signal VPD for six different light levels, and the corresponding third output signals VPWM for the six different light levels. As shown in FIG. 12, the third output signal VPWM will switch to a high state earlier (i.e., closer to time t4) when the first output signal VPD has a large amplitude (i.e., a weak light signal is detected). For example, the third output signal VPWM that corresponds to a weak detected light signal 102 switches to a high state at time t5, and a third output signal VPWM that corresponds to a strong detected light signal 104 switches to a high state at time t6.

The counter 98 starts a counter at time t4, and stops the counter when the third output signal VPWM switched to a high state. Subsequently, the counter 98 outputs the value of the counter as the count value ADCOUT to the output 86. In one embodiment, the counter 98 initiates a counter at time t4 and increments the counter every rising edge of the clock signal CLK. In one embodiment, the counter 98 initiates a counter at time t4 and increments the counter every falling edge of the clock signal CLK. In one embodiment, the count value ADCOUT is a digital value.

The count value ADCOUT is proportional to the amount of light detected by the light sensor 36, and, thus, is proportional to an amount of fluid present at or in the head of the nozzle 26. A small count value ADCOUT represents a small amount of light detected by the light sensor 36, and, thus, a small amount of fluid present at or in the head of the nozzle 26. For example, referring to FIG. 12, the count value ADCOUT has a hexadecimal value 2 at time t5, which corresponds to the weak detected light signal 102. Conversely, a large count value ADCOUT represents a large amount of light detected by the light sensor 36, and, thus, a large amount of fluid present at or in the head of the nozzle 26. For example, referring to FIG. 12, the count value ADCOUT has a hexadecimal value C at time t6, which corresponds to the strong detected light signal 104.

As discussed with respect to FIGS. 5 and 6, readout circuitry may be repeated for each of a plurality of optical blockage detectors.

Figure 13:
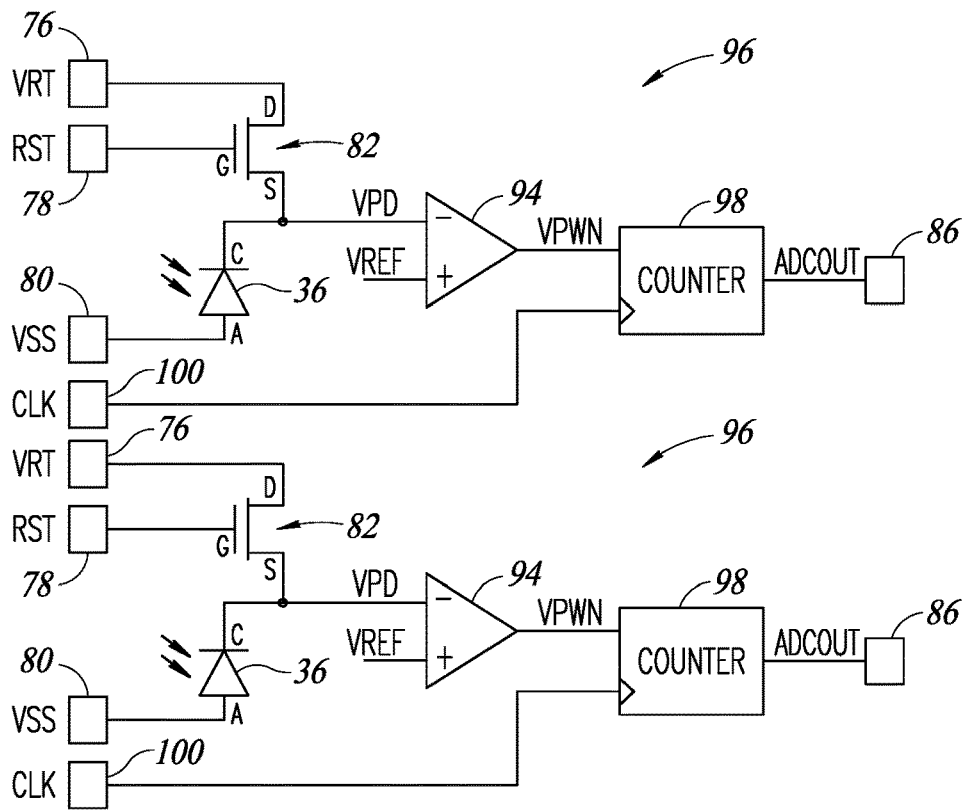
FIG. 13 shows a plurality of the readout circuitry of FIG. 11 according to an embodiment disclosed herein.

FIG. 13 shows a plurality of the readout circuitry 96 according to an embodiment disclosed herein. Similar to the embodiment shown in FIG. 5, two readout circuits 96 are shown. Each of the two readout circuits 96 receives and reads electrical signals from a respective optical blockage detector, more specifically a respective light sensor. Each of the readout circuits 96 have the same configuration and components as the readout circuitry 96 shown in FIG. 11.

The readout circuits 96 are arranged in parallel. Namely, each of the two readout circuits 96 output the count value ADCOUT from the output 86. The count value ADCOUT are output separately and in parallel with each other.

Although two readout circuits 96 are shown in FIG. 13, the fluidic ejection device 10 may include any number of readout circuits. In one embodiment, the fluidic ejection device 10 includes a readout circuit for each nozzle (i.e., the number of readout circuits in the fluidic ejection device 10 is equal to the number of nozzles in the fluidic ejection device 10).

Figure 14:
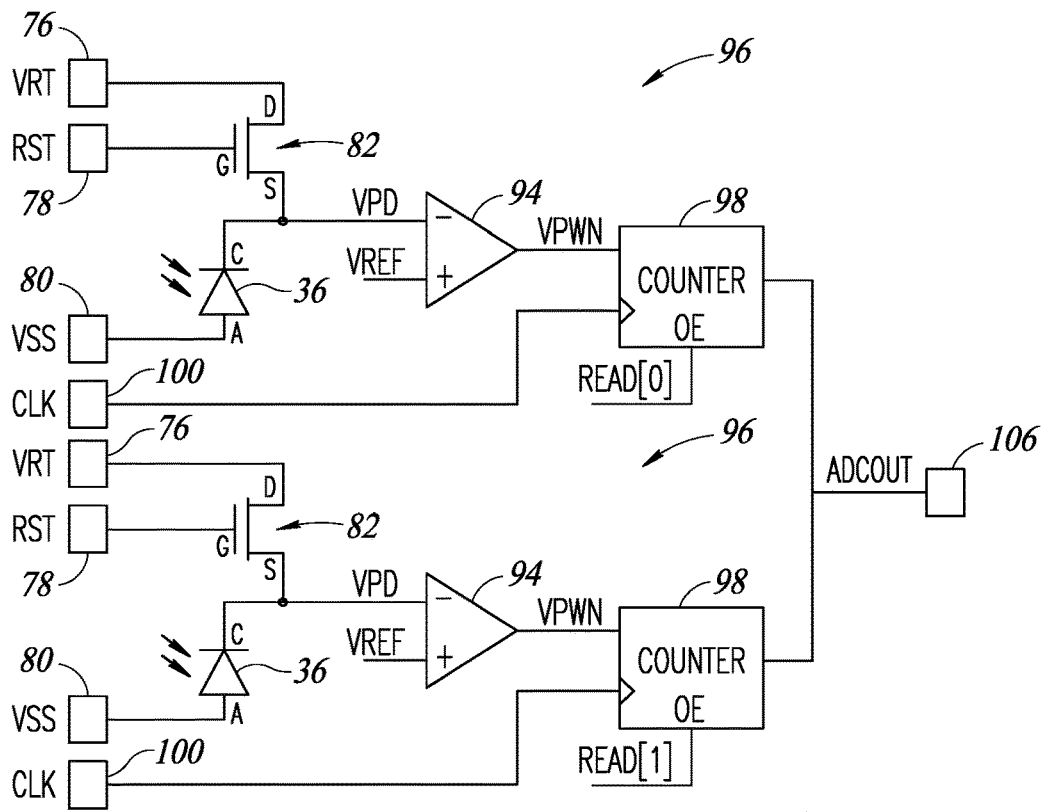
FIG. 14 shows a plurality of readout circuitry of FIG. 11 according to another embodiment disclosed herein.

FIG. 14 shows a plurality of readout circuitry 96 according to another embodiment disclosed herein. The embodiment shown in FIG. 14 is similar to the embodiment shown in FIG. 13. For example, each of the two readout circuits 96 output the count value ADCOUT separately and in parallel with each other. However, in contrast to the embodiment shown in FIG. 13, the count value ADCOUT of the two readout circuitry 96 are multiplexed and electrically coupled to a single output 106.

In the embodiment shown in FIG. 14, each of the counters 98 includes an output-enable OE input configured to receive a read signal. Each of the counters 98 outputs the count value ADCOUT in response to receiving a read signal at the output-enable input OE. Namely, the counter 98 does not output the count value ADCOUT in response to receiving a disable read signal READ[0], and outputs the count value ADCOUT in response to receiving an enable read signal READ[1]. For example, referring to FIG. 14, the counter 98 for the upper readout circuitry 96 receives a disable read signal READ[0]. Thus, the count value ADCOUT for the upper readout circuitry 96 is not outputted out of the output 106. Conversely, the counter 98 for the lower readout circuitry 96 receives an enable read signal READ[1]. Thus, the count value ADCOUT for the lower readout circuitry 96 will be outputted out of the output 106. Accordingly, the count value ADCOUT of the plurality of readout circuitry 96 may be multiplexed by selectively supplying the disable read signal READ[0] and the enable read signal READ[1] to the counters 98.

The various embodiments disclosed herein provide a fluidic ejection device configured to detect whether one or more nozzles of the fluidic ejection device is in a normal state, a blocked nozzle state, or an accumulated fluid state. The fluidic ejection device includes an optical blockage detector having a light emitting device configured to emit a light signal, and a light sensor configured to detect the light signal. The optical blockage detector detects the normal state, the blocked nozzle state, and the accumulated fluid state based on the detected light signal.

According to one embodiment, a device includes a substrate, a first structural layer on the substrate, a chamber between the substrate and the first structural layer, a second structural layer on the first structural layer, and a nozzle coupled to the chamber. The nozzle has sidewalls and extends through the second structural layer. The device further includes a light emitter on the second structural layer, and a light receiver in the second structural layer and adjacent to the sidewalls of the nozzle.

According to one embodiment, a device includes a substrate, a first structural layer on the substrate, a chamber between the substrate and the first structural layer, a second structural layer on the first structural layer, a nozzle having sidewalls and extending through the second structural layer, a light emitter on the second structural layer, a photodiode in the second structural layer and adjacent to the sidewalls of the nozzle, and readout circuitry including a first transistor and a second transistor. A source of the first transistor is electrically coupled to a cathode of the photodiode, and a gate of the second transistor is electrically coupled to the source of the first transistor and the cathode of the photodiode.

According to one embodiment, a device includes a substrate, a first structural layer on the substrate, a chamber between the substrate and the first structural layer, a second structural layer on the first structural layer, a nozzle having sidewalls and extending through the second structural layer, a light emitter on the second structural layer, a photodiode in the second structural layer and adjacent to the sidewalls of the nozzle, and readout circuitry including a transistor and an operational amplifier. A source of the transistor is electrically coupled to a cathode of the photodiode, and the operational amplifier being is coupled to the source of the transistor and the cathode of the photodiode.

According to one embodiment, a device includes a substrate, a first structural layer on the substrate, a chamber between the substrate and the first structural layer, a second structural layer on the first structural layer, a nozzle having sidewalls and extending through the second structural layer, a light emitter on the second structural layer, a photodiode in the second structural layer and adjacent to the sidewalls of the nozzle, and readout circuitry including a transistor, an operational amplifier, and a counter. A source of the transistor is electrically coupled to a cathode of the photodiode, the operational amplifier is electrically coupled to the source of the transistor and the cathode of the photodiode, and the counter is electrically coupled to the operational amplifier.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   instructing a fluidic ejection device to eject fluid out of a nozzle of the fluidic ejection device, the fluidic ejection device including a light emitting device and a light sensor positioned on opposite sides of the nozzle;
   emitting, by the light emitting device, a first light signal towards the nozzle;
   measuring, by the light sensor, the first light signal while the fluid ejection device is ejecting fluid out of the nozzle;
   instructing the fluidic ejection device to stop ejecting fluid out of the nozzle of the fluidic ejection device;
   emitting, by the light emitting device, a second light signal towards the nozzle;
   measuring, by the light sensor, the second light signal while the fluidic ejection device has stopped ejecting fluid out of the nozzle; and
   determining, by control circuitry, whether the fluidic ejection device is in a normal state, a blocked nozzle state, or an accumulated fluid state based on the measured first light signal and the measured second light signal.

2. The method of claim 1 wherein the control circuitry determines the fluidic ejection device is in the normal state in response to the measured first light signal being above a predetermined threshold and the measured second light signal is below the predetermined threshold.

3. The method of claim 1 wherein the control circuitry determines the fluidic ejection device is in the blocked nozzle state in response to the measured first light signal being below a predetermined threshold and the measured second light signal is below the predetermined threshold.

4. The method of claim 1 wherein the control circuitry determines the fluidic ejection device is in the accumulated fluid state in response to the measured first light signal being above a predetermined threshold and the measured second light signal is above the predetermined threshold.

5. A method, comprising:
   instructing, by control circuitry, a fluidic ejection device to eject fluid out of a nozzle;
   emitting, by a light emitter, light towards the nozzle in response to instructing the fluidic ejection device to eject fluid;
   detecting, by a light sensor, a first light signal while the fluid ejection device is ejecting fluid out of the nozzle in response to instructing the fluidic ejection device to eject fluid;
   instructing, by the control circuitry, the fluidic ejection device to stop ejecting fluid out of the nozzle;
   emitting, by the light emitter, light towards the nozzle in response to instructing the fluidic ejection device to stop ejecting fluid;
   detecting, by the light sensor, a second light signal while the fluidic ejection device has stopped ejecting fluid out of the nozzle in response to instructing the fluidic ejection device to stop ejecting fluid; and
   determining, by the control circuitry, whether the fluidic ejection device is in a normal state, a blocked nozzle state, or an accumulated fluid state based on the detected first light signal and the detected second light signal.

6. The method of claim 5 wherein the control circuitry determines the fluidic ejection device is in the normal state in response to the detected first light signal is above a predetermined threshold and the detected second light signal is below the predetermined threshold.

7. The method of claim 5 wherein the control circuitry determines the fluidic ejection device is in the blocked nozzle state in response to the detected first light signal is below a predetermined threshold and the detected second light signal is below the predetermined threshold.

8. The method of claim 5 wherein the control circuitry determines the fluidic ejection device is in the accumulated fluid state in response to the detected first light signal is above a predetermined threshold and the detected second light signal is above the predetermined threshold.

9. The method of claim 5 wherein
   the fluidic ejection device includes the nozzle, the light emitter and the light sensor, and
   the light emitter and the light sensor are positioned on opposite sides of the nozzle.

10. The method of claim 5 wherein the fluidic ejection device includes:
    a substrate;
    a first structural layer on the substrate;
    a chamber between the substrate and the first structural layer;
    a second structural layer on the first structural layer;

the nozzle coupled to the chamber, the nozzle having sidewalls and extending through the second structural layer;

the light emitter on the second structural layer; and the light sensor in the second structural layer and adjacent to the sidewalls of the nozzle.

11. The method of claim 5 wherein the light emitter is configured to emit light through fluid directly overlying the nozzle.

12. The method of claim 5 wherein the measuring of the first light signal is during a first time period, and the measuring of the second light signal is during a second time period subsequent to the first time period.

13. The method of claim 5 wherein detecting of the first light signal is during a first time period, and the detecting of the second light signal is during a second time period subsequent to the first time period.

14. A method, comprising:

ejecting, by a fluidic ejection device, a fluid out of a nozzle of the fluidic ejection device, the fluidic ejection device including a light emitting device and a light sensor positioned on opposite sides of the nozzle;

emitting, by the light emitting device, a first light signal towards the nozzle;

measuring, by the light sensor, the first light signal while the fluid ejection device is ejecting fluid out of the nozzle;

stopping, by the fluidic ejection device, the ejecting of the fluid out of the nozzle of the fluidic ejection device;

emitting, by the light emitting device, a second light signal towards the nozzle;

measuring, by the light sensor, the second light signal while the fluidic ejection device has stopped ejecting fluid out of the nozzle; and determining, by control circuitry, the fluidic ejection device is in a state selected from a plurality of states including a normal state, a blocked nozzle state, and an accumulated fluid state based on the measured first light signal and the measured second light signal.

15. The method of claim 14 wherein the control circuitry determines the fluidic ejection device is in the normal state in response to the measured first light signal is above a threshold value and the measured second light signal is below the threshold value.

16. The method of claim 14 wherein the control circuitry determines the fluidic ejection device is in the blocked nozzle state in response to the measured first light signal is below a threshold value and the measured second light signal is below the threshold value.

17. The method of claim 14 wherein the control circuitry determines the fluidic ejection device is in the accumulated fluid state in response to the measured first light signal is above a threshold value and the measured second light signal is above the threshold value.

18. The method of claim 14 wherein the measuring of the first light signal is during a first time period, and the measuring of the second light signal is during a second time period subsequent to the first time period.

19. The method of claim 14 wherein the light emitting device is configured to transmit the first light signal and the second light signal through fluid directly overlying the nozzle.

20. The method of claim 14 wherein the nozzle is clogged in the blocked nozzle state, and fluid is in or on the nozzle in the accumulated fluid state.

21. The method of claim 14 wherein the control circuitry determines the fluidic ejection device is in the normal state in response to the measured first light signal and the measured second light signal having first amplitudes, in the blocked nozzle state in response to the measured first light signal and the measured second light signal having second amplitudes different from the first amplitudes, and in the accumulated fluid state in response to the measured first light signal and the measured second light signal having third amplitudes different from the second amplitudes.

\* \* \* \* \*